United States Patent
Kitamoto

(10) Patent No.: US 11,757,303 B2
(45) Date of Patent: Sep. 12, 2023

(54) EXTERNAL POWER FEEDER AND EXTERNAL POWER SUPPLY SYSTEM

(71) Applicant: HONDA MOTOR CO., LTD., Tokyo (JP)

(72) Inventor: Ryota Kitamoto, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/676,255

(22) Filed: Feb. 21, 2022

(65) Prior Publication Data

US 2022/0311271 A1    Sep. 29, 2022

(30) Foreign Application Priority Data

Mar. 24, 2021 (JP) .................. 2021-050502

(51) Int. Cl.
  *H02J 9/06* (2006.01)
  *B60L 55/00* (2019.01)
  (Continued)

(52) U.S. Cl.
  CPC ............. *H02J 9/062* (2013.01); *B60L 55/00* (2019.02); *H02J 3/322* (2020.01);
  (Continued)

(58) Field of Classification Search
  CPC ................ H02J 9/04; H02J 9/06; B60L 55/00
  (Continued)

(56) References Cited

U.S. PATENT DOCUMENTS

| 7,414,332 B2* | 8/2008 | Ohsuga ................ H02J 1/06 307/43 |
| 2013/0026822 A1* | 1/2013 | Chao .................. H02J 1/108 307/65 |

(Continued)

FOREIGN PATENT DOCUMENTS

| JP | 2008236902 A | 10/2008 |
| JP | 12013078168 A | 4/2013 |

(Continued)

OTHER PUBLICATIONS

Notification of Reasons for Refusal issued in the JP Patent Application No. 2021-050502, dated Apr. 11, 2023.

*Primary Examiner* — Daniel Kessie
*Assistant Examiner* — Dru M Parries
(74) *Attorney, Agent, or Firm* — CKC & Partners Co., LLC

(57) ABSTRACT

Provided is an external power feeder and an external power supply system that make it possible to continuously supply power to an external load even at a location without an electrical facility.

An external power feeder connectable to a plurality of power supply sources includes: a plurality of connection ports which are respectively in connection with the plurality of power supply sources; a connection state acquisition unit that acquires a connection state of each of the plurality of connection ports with the power supply source; a power supply state acquisition unit that acquires a power supply state from each of the plurality of power supply sources; and a switching unit that switches from power supply from one power supply source to power supply from one other power supply source, among the connected power supply sources, based on a power supply state of the one power supply source.

4 Claims, 8 Drawing Sheets

(51) Int. Cl.
*H02J 7/00* (2006.01)
*H02J 3/32* (2006.01)

(52) U.S. Cl.
CPC ........ *H02J 7/00032* (2020.01); *H02J 7/0048* (2020.01); *H02J 2207/20* (2020.01)

(58) Field of Classification Search
USPC .......................................................... 307/86
See application file for complete search history.

(56) References Cited

U.S. PATENT DOCUMENTS

| | | |
|---|---|---|
| 2015/0251547 A1 | 9/2015 | Nonomura et al. |
| 2017/0229876 A1* | 8/2017 | Jhunjhunwala ......... B60L 58/15 |
| 2017/0334305 A1 | 11/2017 | Sumimura et al. |
| 2019/0126768 A1 | 5/2019 | Niwa et al. |

FOREIGN PATENT DOCUMENTS

| | | |
|---|---|---|
| JP | 2013099207 A | 5/2013 |
| JP | 2015171219 A | 9/2015 |
| JP | 2017051039 A | 3/2017 |
| JP | 2019086841 A | 6/2019 |
| JP | 2020092504 A | 6/2020 |
| WO | 2013061410 A1 | 5/2013 |
| WO | 2017038753 A1 | 3/2017 |

* cited by examiner

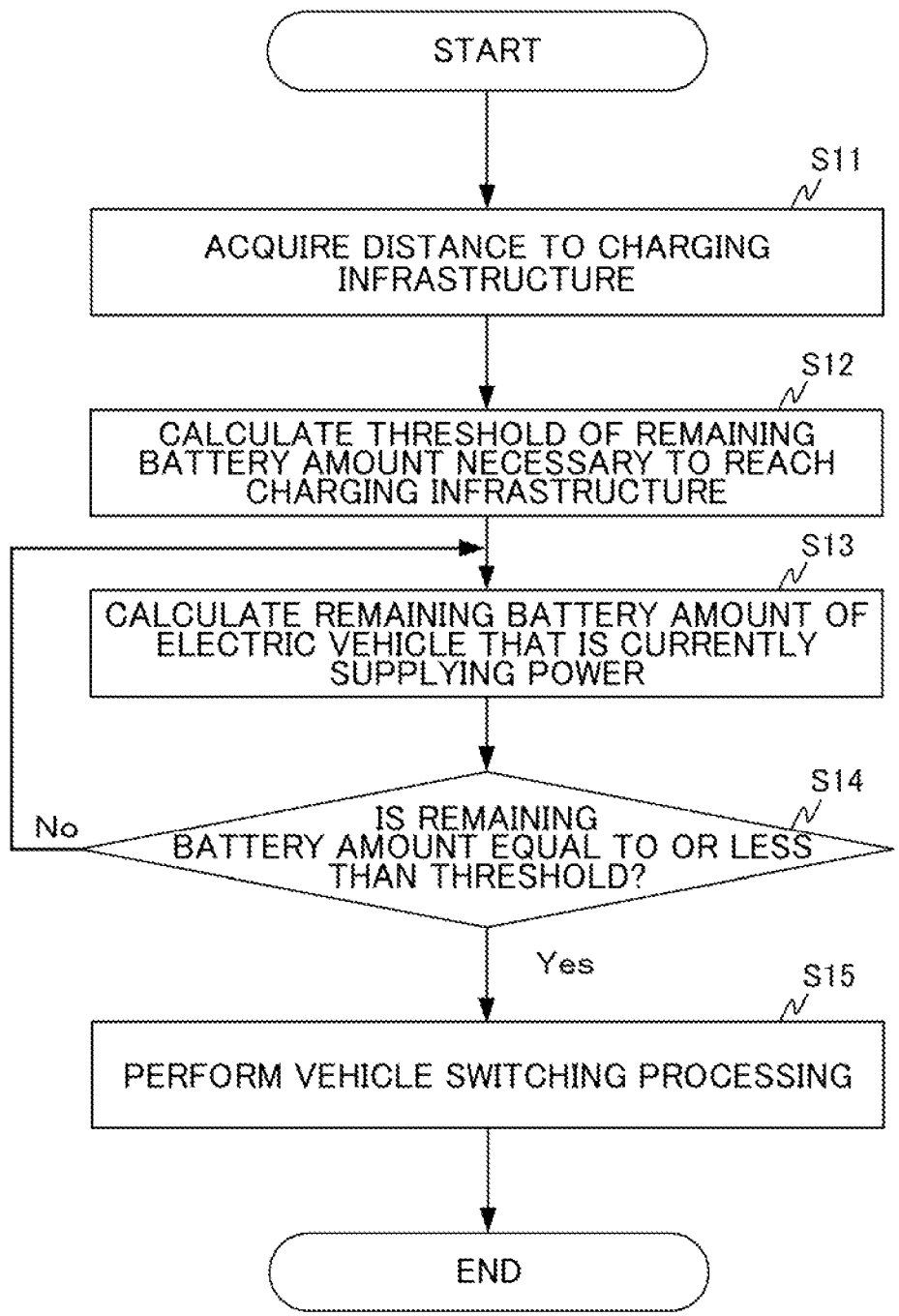

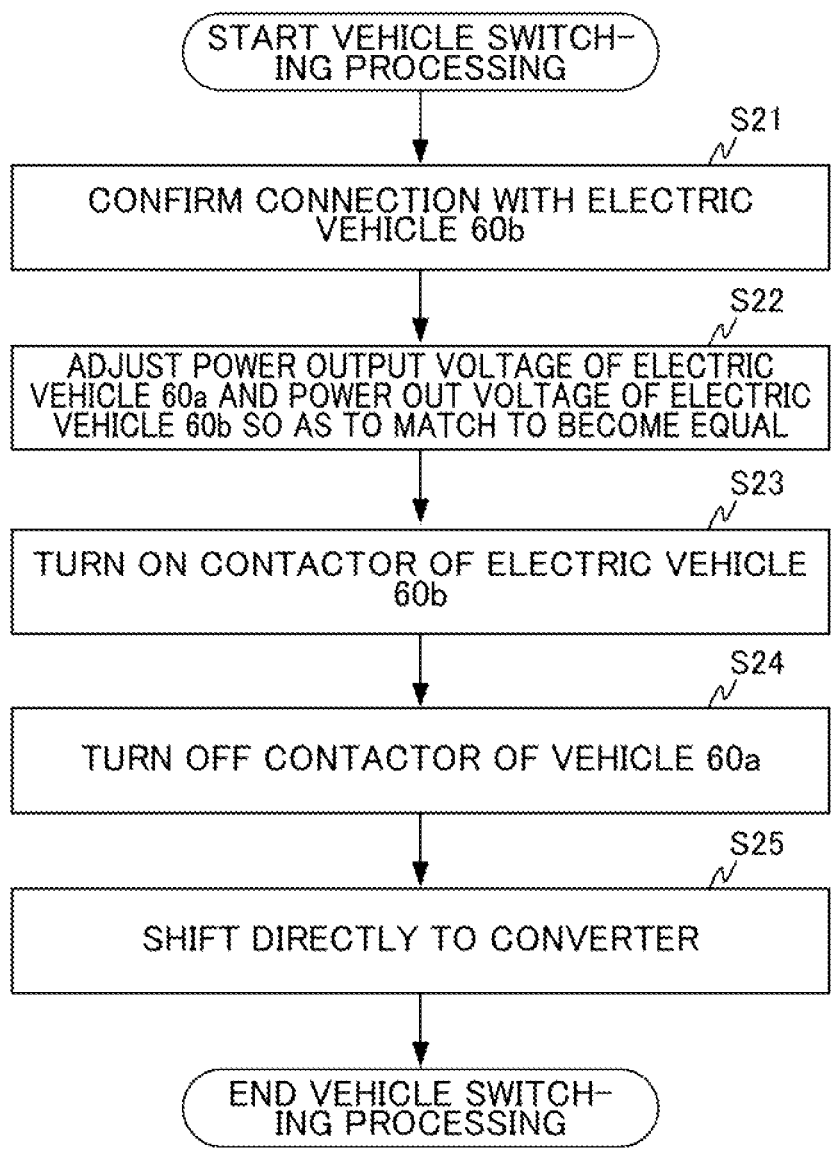

EXTERNAL POWER FEEDER AND EXTERNAL POWER SUPPLY SYSTEM

This application is based on and claims the benefit of priority from Japanese Patent Application No. 2021-050502, filed on 24 Mar. 2021, the content of which is incorporated herein by reference.

BACKGROUND OF THE INVENTION

Field of the Invention

The present disclosure relates to an external power feeder and an external power supply system for receiving power from a vehicle.

Related Art

With the popularization of electric vehicles, fuel cell vehicles, plug-in hybrid vehicles, etc., technology has been known for utilizing a vehicle such as an electric vehicle or a fuel cell vehicle as a power source in a location without an electrical facility during, for example, disasters and outdoor activities.

For example, Patent Document 1 proposes technology for operating with the power of the auxiliary battery of a vehicle, and supplying the power of the power storage device of the vehicle to an external load.

Patent Document 1: Japanese Unexamined Patent Application, Publication No. 2020-92504

SUMMARY OF THE INVENTION

Although an external power feeder is required to take power from a vehicle, since the conventional external power feeder assumes only a single vehicle to be connected, it includes only one input port available for the connection. Therefore, for example, when the battery of the vehicle runs out, it is necessary to once disconnect the connection and change the connection to another vehicle.

Furthermore, since the power that can be supplied from one vehicle to the external load is limited, it is necessary to charge in the charging infrastructure such as charging stations and hydrogen stations. However, access to the charging infrastructure is poor at a location without any electrical facility during disasters, outdoor activities, etc.

Furthermore, in a location without an electrical facility as described above, electricity is generally supplied by a power generator, etc. However, since carbon neutrality has been demanded recently, there is a demand for a vehicle and equipment capable of supplying power such as an electric vehicle even at such a location.

Exemplary embodiments according to the present disclosure provide an external power feeder and an external power supply system that make it possible to continuously supply power to an external load even at a location without an electrical facility.

(1) An external power feeder according to the present invention (for example, external power feeder 20 to be described later) connectable to a plurality of power supply sources (for example, electric vehicles 60 to be described later) is provided which includes:

a plurality of connection ports (for example, connection ports 21 to be described later) which are respectively in connection with the plurality of power supply sources;

a connection state acquisition unit (for example, a connection state acquisition unit 210 to be described later) that acquires a connection state of each of the plurality of connection ports with the power supply sources;

a power supply state acquisition unit (for example, a power supply state acquisition unit 220 to be described later) that acquires a power supply state from each of the plurality of power supply sources; and a switching unit (for example, a contactor 25) that, in a case in which the connection state acquisition unit has detected at least two connections of the power supply sources, switches from power supply from one power supply source that supplies power to power supply from one other power supply source, among the connected power supply sources, based on a power supply state of the one power supply source acquired by the power supply state acquisition unit.

By virtue of the abovementioned (1), it is possible to continuously use the external power feeder by switching among the plurality of power supply sources to supply power thereto.

(2) The external power feeder according to (1), further includes an adjustment unit that adjusts an output from each of the plurality of power supply sources to a predetermined value, and the switching unit stops the power supply from the one power supply source after the power supply from the other power supply source has started at the predetermined value, during the power supply from the one power supply source at the predetermined value.

By virtue of the abovementioned (2), it is possible to continuously supply power with an output at a predetermined value without interruption.

(3) In the external power feeder according to (1) or (2), the power supply state acquisition unit acquires information as to whether each of the plurality of power supply sources can supply power or not based on a remaining power amount of each of the plurality of power supply sources, and determines that supplying power is not possible when the remaining power amount is equal to or less than a predetermined amount, and the switching unit switches to power supply from a power supply source available for charging among the plurality of power supply sources.

By virtue of the abovementioned (3), it is possible to continuously supply power with an output at a predetermined value without interruption.

(4) An external power supply system (for example, an external power supply system 1 to be described later) according to the present invention includes:

the external power feeder (for example, the external power feeder 20 to be described later) according to any one of (1) to (3);

a terminal device of a user (for example, a user terminal 40 to be described later) of the external power feeder;

a plurality of power supply sources (for example, electric vehicles 60 to be described later); and a management device (for example, a server 10 to be described later), in which the plurality of power supply sources are mobile bodies, the external power feeder or the terminal device transmits power supply request information to the management device, and the management device acquires power supply-receiving information of the plurality of power supply sources, and transmits the power supply request information of the external power feeder to the plurality of power supply sources.

By virtue of the abovementioned (4), it is possible to continuously supply power even at a location away from the charging infrastructure.

According to the exemplary embodiments of the present disclosure, it is possible to continuously supply power to an external load even in a location without an electric facility.

BRIEF DESCRIPTION OF THE DRAWINGS

FIG. 7 is a flowchart showing an operation of confirming a power supply state of an electric vehicle that is supplying power in an exemplary embodiment of the present disclosure; and FIG. 8 is a flowchart showing an operation at the time of vehicle switching in an exemplary embodiment of the present disclosure.

DETAILED DESCRIPTION OF THE INVENTION

Hereinafter, a preferred exemplary embodiment of an external power feeder according to the present disclosure will be described with reference to the drawings. It should be noted that the external power feeder of an exemplary embodiment of the present disclosure is a device that characterizes the present disclosure to be added to the external power supply system. For this reason, an external power supply system will be described in conjunction with the description of the external power feeder.

In addition, herein, a case where two electric vehicles (hereinafter, also referred to as "electric vehicles") are connected to an external power feeder as a power supply source will be exemplified. In addition, the present disclosure is also applicable to a case where three or more electric vehicles are connected.

Figure 1:
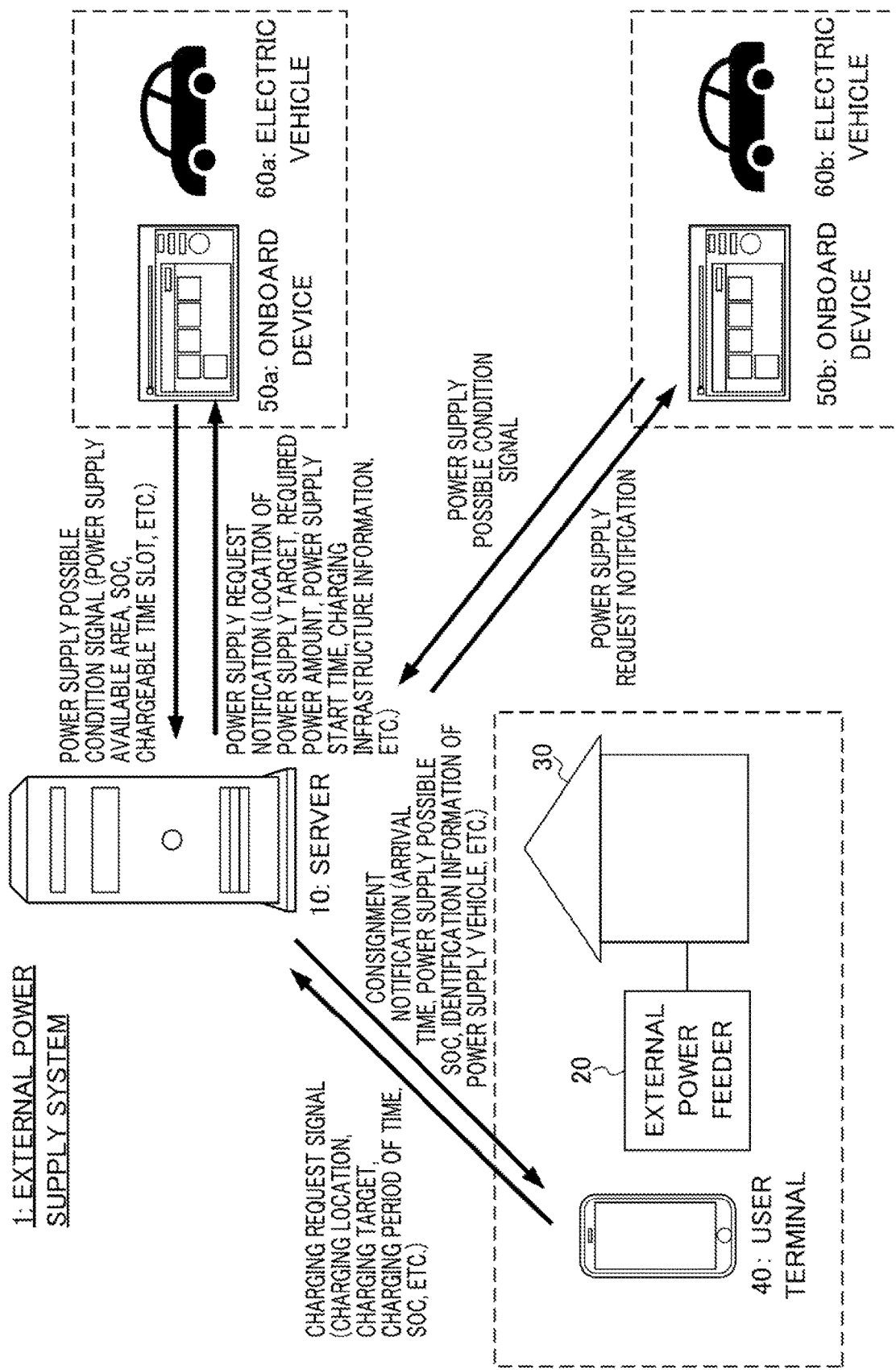
FIG. 1 is a block diagram showing a basic configuration of an entire external power supply system including an external power feeder which is an exemplary embodiment of the present disclosure.

FIG. 1 shows an entire configuration of an external power supply system 1.

As shown in FIG. 1, the external power supply system 1 includes a server 10 as a management device of the external power supply system 1, an external power feeder 20, a user terminal 40 of a user who uses the external power supply system 1 to use the external power feeder 20, onboard devices 50a and 50b mounted in an electric vehicle for use by a provider that provides power to the external power feeder 20, and electric vehicles 60a and 60b as mobile bodies in which the onboard devices 50a and 50b are respectively mounted to provide power to the external power feeder 20. The server 10, the user terminal 40, and the onboard devices 50a and 50b are communicatively connected to each other via a communication network (not shown) such as a mobile telephone network of a standard such as the Internet, 4G and 5G. Although information transmitted and received by the server 10, the user terminal 40, and the onboard devices 50a and 50b is also illustrated in the drawings, this information is merely an example. In the present exemplary embodiment, information other than that illustrated may be transmitted and received.

The user terminal 40 is provided, for example, for each user who uses the external power feeder 20. Similarly, the onboard device 50 is provided, for example, for each electric vehicle 60 of the provider. In the following description, when the onboard device 50 is distinguished for each provider, it is exemplified as the onboard devices 50a and 50b, for example, as shown in FIG. 1. Furthermore, in the following description, when the onboard device 50 is described without distinguishing the provider, the alphabet character at the end will be omitted, and it is simply referred to as "onboard device 50". The same also applies to the electric vehicle 60.

<Overview of Processing>

Conventionally, for example, it is necessary to provide an external power feeder in order to receive the power from the electric vehicle 60 such as an electric vehicle; however, since the conventional external power feeder assumes only the connection from one of the electric vehicles 60, the external power feeder includes only one connection port. For this reason, for example, when the power remaining amount of the charging device (battery remaining amount) such as a lithium-ion battery included in the electric vehicle 60 is reduced, it is necessary to once disconnect the connection and switch the connection to another electric vehicle 60. When the connection is changed, the supply of electric power to the external load may be stopped. In view of the above, the external power feeder 20 according to an exemplary embodiment of the present disclosure can solve the above-described problems by providing a plurality of connection ports, calculating the power remaining amount (battery remaining amount) of the electric vehicle 60 and switching to another electric vehicle 60 when the power remaining amount (battery remaining amount) is equal to or less than a predetermined amount, as will be described later.

Before providing a detailed description of each apparatus (equipment) constituting the external power supply system 1, an outline of the processing of the external power supply system 1 will be briefly described.

First, a user registers information about the user (e.g., name, address, mail address, etc.) and information about the external power feeder 20 (e.g., device name, serial number, number of connections, etc.) in the server 10 in advance via the user terminal 40, for example.

In addition, the provider registers information about the provider (e.g., name, address, mail address, etc.) and information about the electric vehicle 60 (e.g., vehicle type, license plate number, vehicle ID of VIN (vehicle identification number), etc.) in the server 10 in advance via the onboard device 50, for example. Furthermore, the provider may register a power supply possible condition signal including information such as the power supply available area of the electric vehicle 60 (current location), the SOC (State of Charge) of the electric vehicle 60, and the chargeable time slot, in the server 10.

As described above, by the user and the provider registering to use the external power supply system 1, the server 10 can collect and manage the information of the registered user and the external power feeder 20, the information of the provider and the electric vehicle 60, and other information.

Furthermore, when requesting the preparation of the electric vehicle 60 for the registered external power feeder 20, the user uses the user terminal 40 to register the charging request signal to the external power feeder 20 in the server 10. More specifically, the user registers in the server 10 the charging request signal including information such as the charging location (address) where the external power feeder 20 is used, the charging target (the external power feeder 20), the charging period of time (charging start time, charging end time), and the SOC of the external power feeder 20. It should be noted that the registration of the charging request signal by the user can be performed at any timing such as in advance by the day of using the external power feeder 20.

The server 10 selects the electric vehicle 60 that can supply power, based on the registered charging request signal and the power supply possible condition signal, and transmits a power supply request notification including information such as the location of the external power feeder 20 of the power supply target, the required power amount, the power supply start time, and the charging infrastructure information (location, route from the charging location, round-trip time) to the onboard device 50 of the selected electric vehicle 60.

When receiving the consignment signal for the transmitted power supply request notification from the onboard device 50, the server 10 transmits to the user terminal 40 a consignment notification including the power supply vehicle information such as the arrival time, the power supply possible SOC, and the identification information of the power supply vehicle (e.g., the name of the provider and the vehicle ID of the electric vehicle 60).

The user connects the external power feeder 20 with the electric vehicles 60*a* and 60*b* of the provider who has come to the requested charging location on the requested date and time of the power supply.

Among the connected electric vehicles 60*a*, 60*b*, the external power feeder 20 causes the electric vehicle 60*a* to feed the power to the external load 30 (e.g., electrical equipment in homes or shelters in the case of a disaster), for example, and the electric vehicle 60*b* stands by. Then, the external power feeder 20 determines whether the SOC (battery remaining amount) of the electric vehicle 60*a* is equal to or less than the battery remaining amount (predetermined amount) required to reach the closest charging infrastructure to the charging location. When the SOC of the electric vehicle 60*a* is determined to be equal to or less than a predetermined amount, the external power feeder 20 switches the power supply from the electric vehicle 60*a* to the electric vehicle 60*b*.

In so doing, it is possible for the external power feeder 20 to continuously supply power to the external load 30 even at a location without any electrical facility during disasters, outdoor activities.

Furthermore, when the SOC of the electric vehicle 60 is determined to be equal to or less than a predetermined amount, in order to charge the power storage device of the electric vehicle 60, the provider of the electric vehicle 60 moves toward the charging infrastructure. In so doing, it is possible for the electric vehicle 60 to avoid a lack of power and provide power again to the external power feeder 20, in a manner like a bucket relay.

The outline of the processing of the external power supply system 1 is briefly explained above.

Next, each apparatus (equipment) constituting the external power supply system 1 will be described.

It should be noted that, although the electric vehicle 60*a* first supplies power to the external power feeder 20 in the following description, the electric vehicle 60*b* also operates similarly when the electric vehicle 60*b* first supplies power to the external power feeder 20.

<Server 10>

The functional blocks of the server 10 will be described with reference to the block diagram of FIG. 2.

Figure 2:
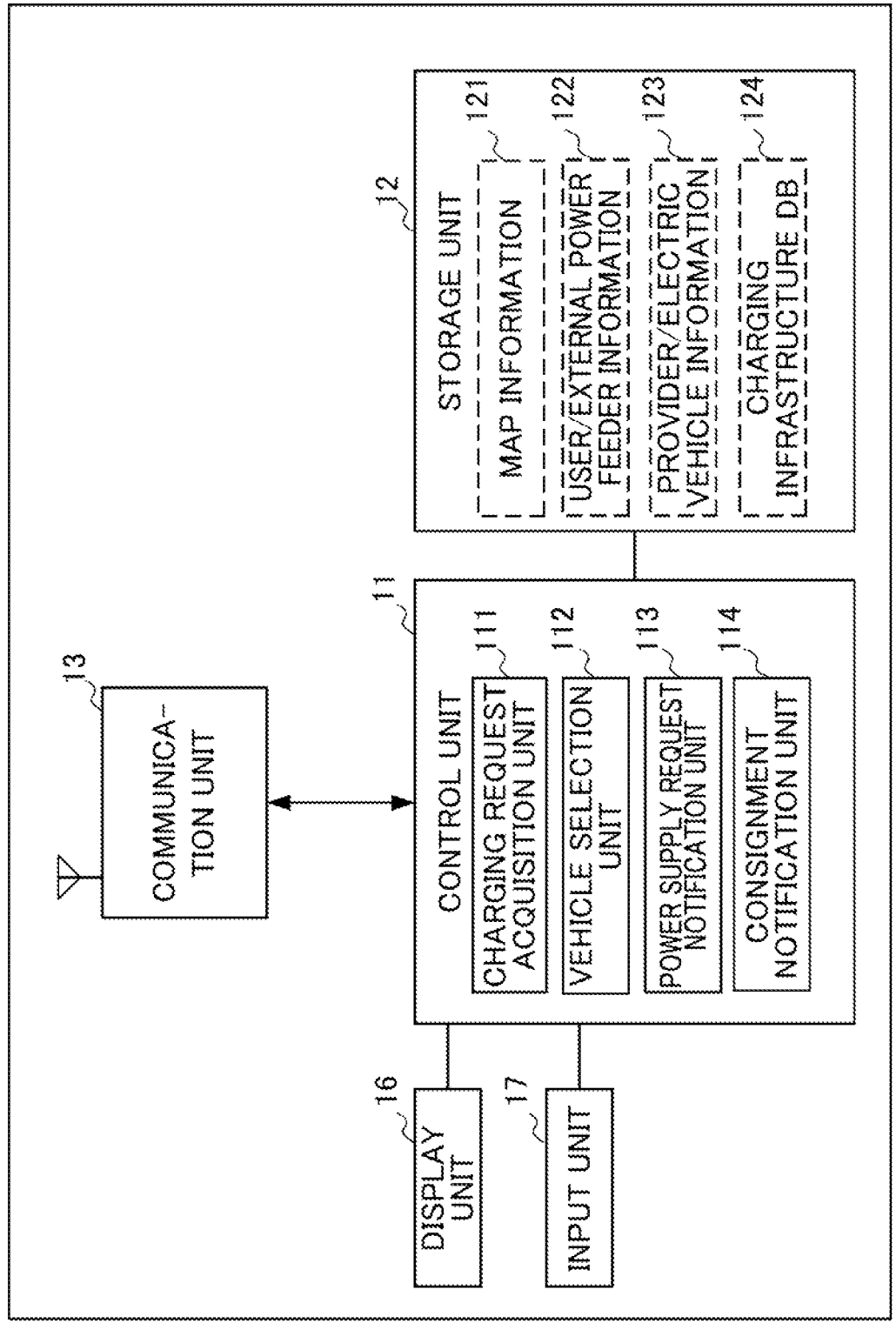
FIG. 2 is a functional block diagram showing the functional configuration of a server according to an exemplary embodiment of the present disclosure.

As shown in FIG. 2, the server 10 includes a control unit 11, a storage unit 12, a communication unit 13, a display unit 16, and an input unit 17.

The control unit 11 includes an arithmetic processing unit such as a microprocessor, and controls each unit constituting the server 10. Details of the control unit 11 will be described later.

The storage unit 12 includes semiconductor memory, for example, and stores various types of information such as a control program including firmware or an operating system, a program for acquiring a charging request signal from the user terminal 40, a program for selecting the electric vehicle 60, and map information. In the drawings, for example, map information 121, user/external power feeder information 122, provider/electric vehicle information 123, and charging infrastructure database (DB) 124 are exemplified as the information stored in the storage unit 12.

The map information 121 includes information on features such as roads, facilities, parking lots, and the like, road information, facility information, parking lot information, and the like. As facility information and parking lot information, positional information of each facility and parking lot is stored as latitude/longitude information. In addition to the latitude/longitude information, information such as an address and a telephone may be stored as the positional information of each facility and parking lot.

The user/external power feeder information 122 includes, for example, information such as a user name including a surname and a first name, a user address, and the like. It should be noted that the user identification ID may be stored for each user. Furthermore, the user/external power feeder information 122 includes, for example, the product name, the serial number, the number of connection ports, and the like of the external power feeder 20 owned for each user.

The provider/electric vehicle information 123 includes, for example, information such as a provider name including a surname and a first name, and a provider address. It should be noted that the provider identification ID may be stored for each provider. Furthermore, the provider/electric vehicle information 123 may include information such as the vehicle type of the electric vehicle 60, the vehicle ID, the power supply available area, the SOC of the electric vehicle 60, and the chargeable time slot for each provider based on the power supply possible condition signal received from the onboard device 50, for example.

The charging infrastructure database 124 is a database in which the positional information of the charging infrastructure such as a charging station or a hydrogen station is stored as latitude/longitude information. It should be noted that, as the positional information of the charging infrastructure, information such as an address, a business time, a telephone number, a charging type, and an output may be stored in addition to the latitude/longitude information.

The communication unit 13 includes a DSP (Digital Signal Processor) and the like, and realizes radio communication between the user terminal 40 and the onboard device 50 via a communication network (not shown) in accordance with a standard such as LTE (Long Term Evolution), 4G, 5G, and the like, or a standard such as Wi-Fi (registered trademark).

The display unit 16 includes a display device such as a liquid crystal display or an organic electroluminescent panel. The display unit 16 displays an image in response to an instruction from the control unit 11.

The input unit 17 includes an input device (not shown) such as a keyboard, a physical switch such as a ten-key pad, and a touch screen provided on the display surface of the display unit 16.

Next, the details of the control unit 11 will be described. The control unit 11 includes, for example, a CPU, RAM, ROM, and a microprocessor having an I/O, and the like. The CPU executes each program read from the ROM or the storage unit 12, reads the information from the RAM, ROM, and the storage unit 12 at the time of execution, writes the information to the RAM and the storage unit 12, and exchanges the signal with the communication unit 13. In this manner, the processing in the present exemplary embodiment is realized by the cooperation of the hardware and the software.

As shown in FIG. 2, the control unit 11 includes, as functional blocks, a charging request acquisition unit 111, a vehicle selection unit 112, a power supply request notification unit 113, and a consignment notification unit 114.

When receiving the charging request signal from the user terminal 40 via the communication unit 13, the charging request acquisition unit 111 acquires the charging location included in the received charging request signal (address), the external power feeder 20 of the charging target, the charging period of time (charging start time, charging end time), the SOC of the external power feeder 20, and other information.

The vehicle selection unit 112 calculates the number of vehicles necessary to supply power to the external power feeder 20, and sets the power supply schedule that sets the required number of vehicles during the requested charging period of time based on the charging location acquired from the user terminal 40 (address), the external power feeder 20 of the charging target, the charging period of time (charging start time, charging end time), and the SOC of the external power feeder 20 (the required amount of power), and the power supply available area included in the provider/electric vehicle information 123, the SOC of the electric vehicle 60 (the amount of power that can be supplied), and the chargeable time slot. The vehicle selection unit 112 selects the required number of electric vehicles 60 that can supply power based on the power receiving schedule.

It should be noted that the vehicle selection unit 112, for example, may acquire the current positional information of the electric vehicle 60 which is positioned by the onboard device 50, and select the electric vehicle 60 based on the current positional information of the acquired electric vehicle 60, and the power supply schedule, together with the information such as the charging location described above. By doing so, it is possible for the server 10 to select the electric vehicle 60 in consideration of the situation of use of the electric vehicle 60 by the provider.

Furthermore, the required number of electric vehicles 60, the number of round trips between the charging location and the charging infrastructure for each electric vehicle 60, and the charging infrastructure to be acquired by the power supply request notification unit 113 to be described later may be set for the power supply schedule.

The power supply request notification unit 113 notifies the onboard device 50 of the selected electric vehicle 60, of the power supply request notification via the communication unit 13. More specifically, the power supply request notification unit 113 acquires the positional information of the charging infrastructure which is the closest to the charging location based on, for example, the charging location acquired from the user terminal 40 (address), and the charging infrastructure database 124. The power supply request notification unit 113 acquires the route from the charging location to the charging infrastructure, the round-trip time, etc., based on the positional information of the acquired charging infrastructure, and the map information 121. Furthermore, the power supply request notification unit 113 notifies the onboard device 50 of the selected electric vehicle 60, of the power supply request notification including the position of the power supply target which is a charging location (address), the required power amount, the power supply start time, and the charging infrastructure information (location (address), route, round-trip period of time).

It should be noted that the power supply request notification unit 113 acquires the positional information of the charging infrastructure closest to the charging location based on the charging location acquired from the user terminal 40 (address), and the charging infrastructure database 124; however, the present disclosure is not limited thereto. For example, the power supply request notification unit 113 may acquire the charging infrastructure of which the charging fee is the cheapest in the charging time slot, the positional information of the charging infrastructure of which the power cost required for the round trip between the charging location and the charging infrastructure is minimized. Alternatively, the power supply request notification unit 113 may acquire the positional information of the charging infrastructure on the way of the electric vehicle 60 heading to a charging location. In so doing, it is possible for the electric vehicle 60 to reduce the number of round trips between the charging location and the charging infrastructure.

The consignment notification unit 114 receives a consignment signal in response to the power supply request notification notified by the power supply request notification unit 113 from the onboard device 50 of the selected electric vehicle 60 via the communication unit 13. It should be noted that the consignment signal received from the onboard device 50 of the selected electric vehicle 60 may include information such as the arrival time and the power supply possible SOC.

Based on the provider/electric vehicle information 123, the consignment notification unit 114 transmits, to the user terminal 40 via the communication unit 13, consignment notification including the power supply vehicle information such as the arrival time of the electric vehicle 60 that has received the consignment signal, the power supply possible SOC, the vehicle ID, and the like, and the information of the provider of the electric vehicle 60 (name, address, telephone number, mail address, and the like of the provider). It should be noted that the consignment notification unit 114 may transmit the consignment notification by using a publicly known function such as, for example, an e-mail by PUSH method or SNS.

It should be noted that, when the consignment notification unit 114 does not receive the consignment signal from the onboard devices 50 of the number of electric vehicles 60 calculated by the vehicle selection unit 112, the vehicle selection unit 112 again selects the required number of electric vehicles 60 based on the power receiving schedule, and the power supply request notification unit 113 may notify the onboard device 50 of the selected electric vehicle 60 of the power supply request notification.

<User Terminal 40>

The user terminal 40 is a terminal for a user of the external power feeder 20 to communicate with, for example, the server 10. As the user terminal 40, for example, a known terminal such as a PC, a tablet terminal, a smartphone, or a portable terminal may be used.

Figure 3:
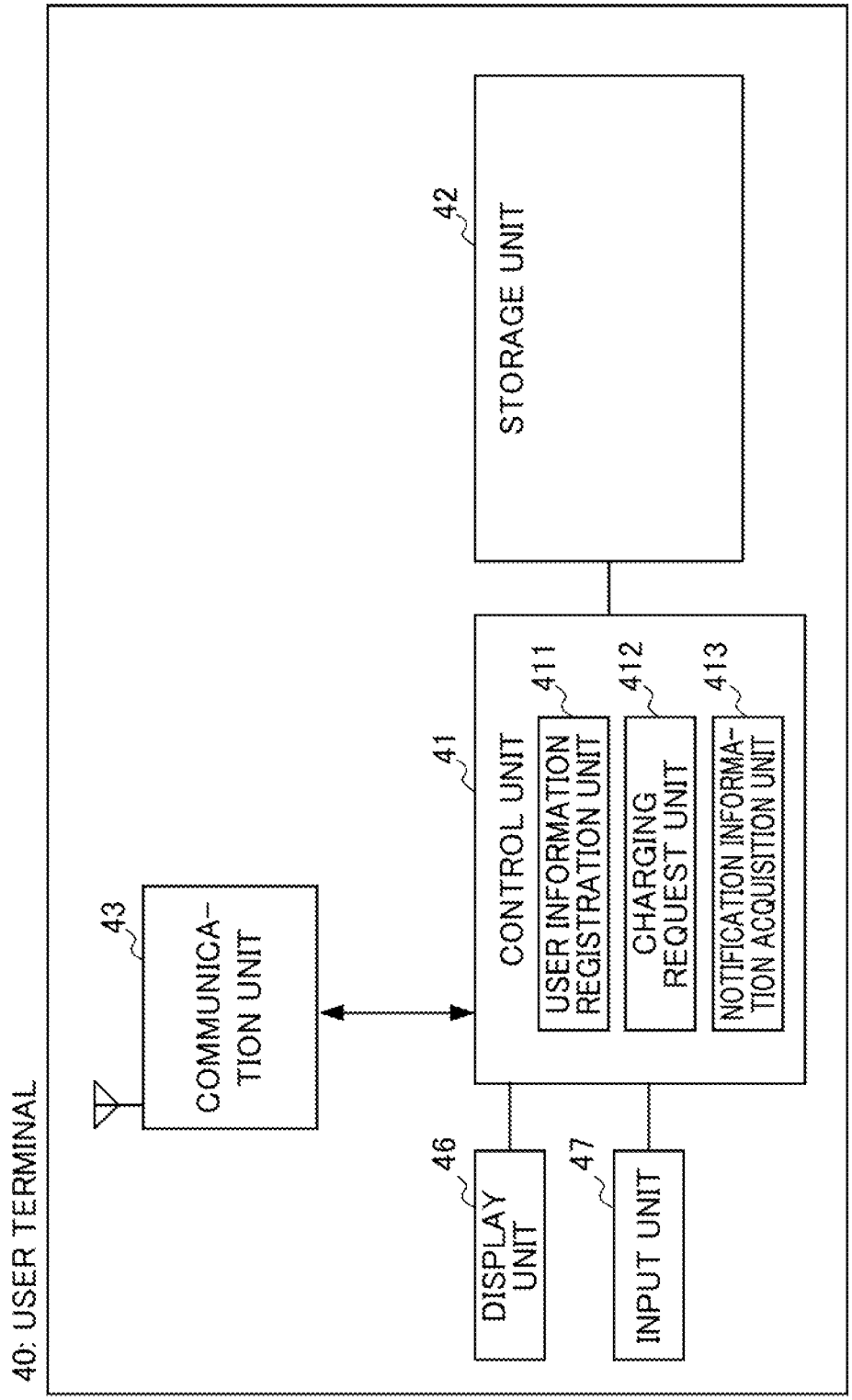
FIG. 3 is a functional block diagram showing the functional configuration of a user terminal in an exemplary embodiment of the present disclosure.

FIG. 3 is a functional block diagram showing the functional configuration of the user terminal 40. As shown in FIG. 3, the user terminal 40 includes at least a control unit 41, a storage unit 42, a communication unit 43, a display unit 46, and an input unit 47.

Herein, the control unit 41, the storage unit 42, the communication unit 43, the display unit 46, and the input unit 47 are realized by hardware equivalent to the functional blocks having the same name included in the server 10 described above; however, they are different in function and use from those of the server 10 described above. Therefore, redundant descriptions of the hardware will be partially omitted, and the explanations of different functions and applications will be described below.

The control unit 41 includes an arithmetic processing unit such as a microprocessor, and controls each unit constituting the user terminal 40. Details of the control unit 41 will be described later.

The storage unit 42 includes semiconductor memory or the like, and may store various programs such as a program for control such as firmware or an operating system, a program for registering information about a user and information about the external power feeder 20, to the server 10, a program for transmitting a charging request signal, and a program for acquiring information about consignment of power supply from the server 10 and presenting the information to the user. Furthermore, the storage unit 42 may store various kinds of information registered in the server 10.

The communication unit 43 includes a DSP (Digital Signal Processor) and the like, and realizes radio communication with, for example, the server 10 and the like via a communication network (not shown) in accordance with standards such as LTE (Long Term Evolution), 4G, 5G, and the like, or a standard such as Wi-Fi (registered trademark).

The display unit 46 includes a display device such as a liquid crystal display or an organic electroluminescent panel. The display unit 46 displays an image in response to an instruction from the control unit 41.

The input unit 47 includes an input device (not shown) such as physical switches such as a ten-key pad, and a touch screen provided on the display surface of the display unit 46.

Next, the details of the control unit 41 will be described. The control unit 41 includes, for example, a CPU, RAM, ROM, and a microprocessor having an I/O or the like. The CPU executes each program read from the ROM or the storage unit 42, at the time of execution of the program, reads the information from, for example, RAM, ROM, and the storage unit 42, writes the information to the RAM and the storage unit 42, and exchanges signals with the communication unit 43, the display unit 46, and the input unit 47. In this manner, the processing in the present exemplary embodiment is realized by the cooperation of the hardware and the software.

As shown in FIG. 3, the control unit 41 includes a user information registration unit 411, a charging request unit 412, and a notification information acquisition unit 413.

As described above, in order to use the external power supply system 1, the user information registration unit 411 receives information about the user (e.g., name, address, mail address, etc.) and information about the external power feeder 20 (e.g., device name, serial number, number of connection ports, etc.) in advance based on an input operation by the user via the input unit 47, and registers the information in the server 10 via the communication unit 43.

As described above, when requesting the arrangement of the electric vehicle 60 for the registered external power feeder 20, the charging request unit 412 registers the charging request signal to the external power feeder 20 to the server 10. More specifically, the charging request unit 412 registers in the server 10 the charging request signal including the charging location inputted by the user via the input unit 47 (address), the external power feeder 20 of the charging target, the charging period of time (charging start time, charging end time), and the SOC of the external power feeder 20 via the communication unit 43.

The notification information acquisition unit 413 acquires the consignment notification notified from the server 10. The notification information acquisition unit 413 may acquire the consignment notification provided from the server 10 by using a known function such as e-mail or SNS based on PUSH method, for example. Then, the notification information acquisition unit 413 acquires the power supply vehicle information (the arrival time of the electric vehicle 60, the power supply possible SOC, the vehicle ID, and the like) and the information of the provider (name, address, telephone number, mail address, and the like of the provider) included in the consignment notification. It should be noted that the notification information acquisition unit 413 may display the acquired consignment notification on the display unit 46, and when a response (Reply) is required, may acquire the response (Reply) from the user via the input unit 47, and may transmit the reply to the server 10.

<External Power Feeder 20>

Figure 4:
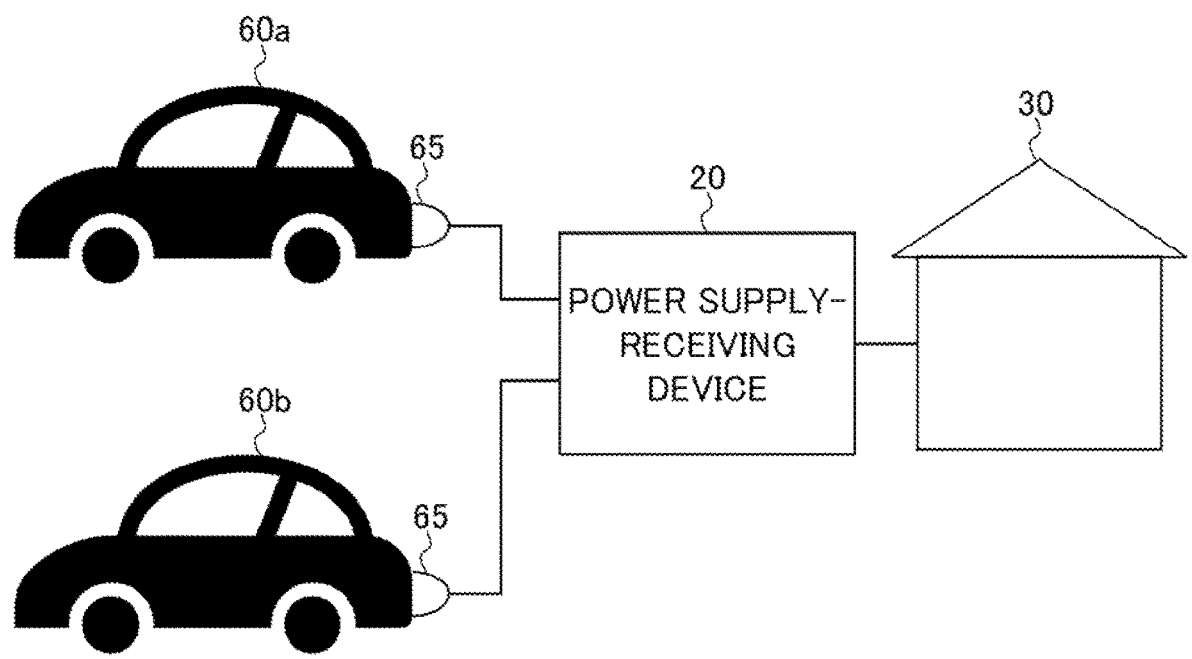
FIG. 4 is a diagram schematically showing a connection example among an external power feeder, an external load, and an electric vehicle in an exemplary embodiment of the present disclosure.

FIG. 4 is a diagram schematically showing a connection example among the external power feeder 20, the external load 30, and the electric vehicle 60 in the present exemplary embodiment. As shown in FIG. 4, two electric vehicles 60a and 60b as power supply sources are connected to the external power feeder 20. It should be noted that three or more electric vehicles 60 may be connected to the external power feeder 20.

As shown in FIG. 4, the external power feeder 20 is connected to the external load 30 (e.g., electrical equipment in homes or shelters in the case of a disaster). In a state in which the external power feeder 20 is connected to a power feed port 65 of the electric vehicle 60, the external power feeder 20 converts DC power of the power storage device (not shown) of the electric vehicle 60 to AC power, and supplies the converted AC power to the external load 30.

Figure 5:
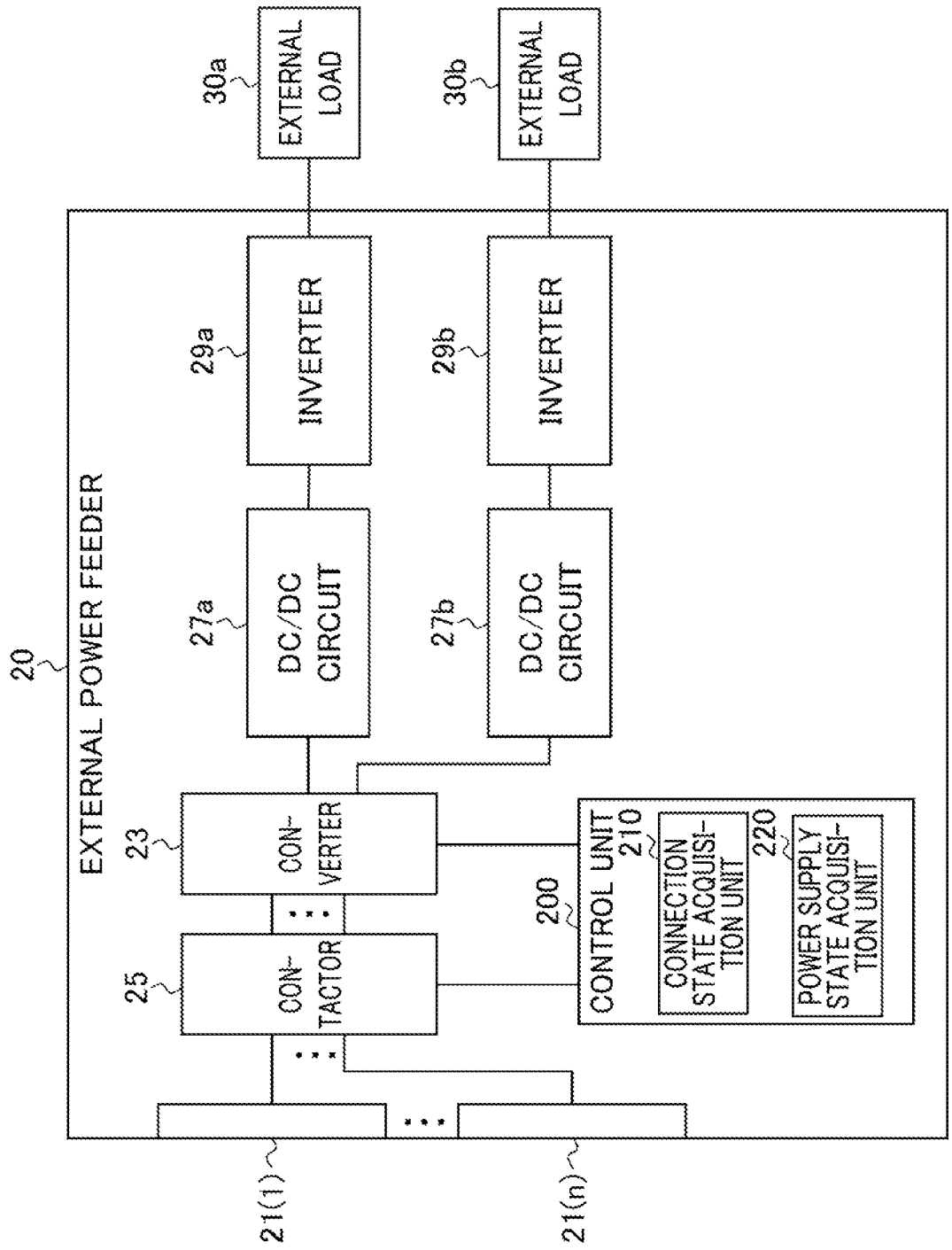
FIG. 5 is a functional block diagram showing a functional configuration of an external power feeder in an exemplary embodiment of the present disclosure.

FIG. 5 is a functional block diagram showing an example of the functional configuration of the external power feeder 20 according to the present exemplary embodiment. As shown in FIG. 5, the external power feeder 20 includes n number of connection ports 21(1) to 21(n), a converter 23, a contactor 25, DC/DC circuits 27a and 27b, inverters 29a and 29b, and a control unit 200 (n is an integer of 2 or more). The external power feeder 20 of FIG. 5 includes two DC/DC circuits 27 (27a and 27b) and two inverters 29 (29a and 29b); however, the present disclosure is not limited thereto, and may include three or more DC/DC circuits 27 and three or more inverters 29.

The connection ports 21(1) to 21(n) are connectable to the power feed port 65 of each of the electric vehicles 60, and receive power from each of the electric vehicles 60.

In the following description, when the connection ports 21 (1) to 21 (n) are described without distinguishing, they are simply referred to as "connection port 21".

The converter 23 as an adjustment unit adjusts the output of the DC power from each electric vehicle 60 as a power supply source to a voltage of a predetermined value which is set in advance based on a control instruction of the control unit 200 to be described later, so as to match to become equal. In other words, when the voltage supplied for each electric vehicle 60 varies, the operation of the external power feeder 20 becomes unstable. In view of this, it is possible to stabilize the operation of the external power feeder 20 by the converter 23 adjusting the voltage so as to become equal.

The contactor 25 as a switching unit connects (turns on) and cuts off (turns off) so as to supply DC power from the selected electric vehicle 60 among the electric vehicles 60 connected to the connection port 21, based on a control instruction of the control unit 200 to be described late. The contactor 25 outputs the DC power from the connected electric vehicle 60 to the DC/DC circuits 27a and 27b.

The DC/DC circuits 27a and 27b convert the DC voltage according to the output of the inverters 29a and 29b.

The inverters 29a and 29b convert the DC power from the electric vehicle 60 to AC power, and supplies the converted AC power to the external loads 30 (30a and 30b). The output voltages of the inverters 29a and 29b are, for example, 100 V or 200 V.

The control unit 200 includes, for example, a CPU, RAM, ROM, and a microprocessor having an I/O or the like. The CPU executes each program read from the ROM, reads the information from the RAM and ROM at the time of the execution, and writes the information to the RAM. In this manner, the processing in the present exemplary embodiment is realized by the cooperation of the hardware and the software.

As shown in FIG. 5, the control unit 200 includes a connection state acquisition unit 210 and a power supply state acquisition unit 220 as functional blocks.

The connection state acquisition unit 210 acquires the connection state with the electric vehicle 60 at each of the connection ports 21, for example, based on a signal line (not shown) indicating a connection state with the power feed port 65 of the electric vehicle 60 installed for each connection port 21.

The power supply state acquisition unit 220 acquires the power supply state of the power storage device (not shown) of the electric vehicle 60 (for example, the electric vehicle 60a) that is connected to the connection port 21 and supplies power to the external power feeder 20 based on the connection state acquired by the connection state acquisition unit 210.

More specifically, the power supply state acquisition unit 220 may, for example, acquire the SOC (battery remaining amount) of the power storage device (not shown) of the electric vehicle 60a as the power supply state based on the values of the voltage and the current in the power storage device (not shown) of the electric vehicle 60a connected to the connection port 21 using a publicly known method.

Furthermore, the power supply state acquisition unit 220 may calculate, as a predetermined amount (threshold), the battery remaining amount (SOC) necessary for the electric vehicle 60a to move to the charging infrastructure based on the distance to the charging infrastructure inputted by the user via an input device included in the external power feeder 20 (not shown). It should be noted that, for example, when the external power feeder 20 includes a communication unit (not shown) for communicating with the user terminal 40, the power supply state acquisition unit 220 may acquire the positional information and the distance or the like of the charging infrastructure from the user terminal 40.

When the SOC (battery remaining amount) of the power storage device (not shown) of the electric vehicle 60a is equal to or less than a predetermined amount, the power supply state acquisition unit 220 may make a determination to switch to another electric vehicle 60 connected to the connection port 21 (e.g., the electric vehicle 60b). When it is determined that the power supply state acquisition unit 220 switches to the electric vehicle 60b, the contactor 25 of the electric vehicle 60b may be turned on (connected), and the contactor 25 of the electric vehicle 60a may be turned off (cut off).

Thereafter, as described above, in order to move the electric vehicle 60a to the charging infrastructure, the power feed port 65 of the electric vehicle 60a is disconnected from the connection port 21, and only the electric vehicle 60b is connected to the connection port 21. Therefore, the converter 23 does not need to adjust the voltage from the electric vehicle 60b to a predetermined value to match to become equal, and shifts directly to the DC/DC circuits 27a and 27b via the contactor 25. In doing so, it is possible to reduce the loss in the external power feeder 20.

<Onboard Device 50>

The onboard device 50 is a terminal for a provider of the electric vehicle 60 to communicate with, for example, the server 10. As the onboard device 50, a navigation device mounted in the electric vehicle 60, or a publicly known terminal such as a PC, a tablet terminal, a smartphone, or a portable terminal of a provider may be used.

Figure 6:
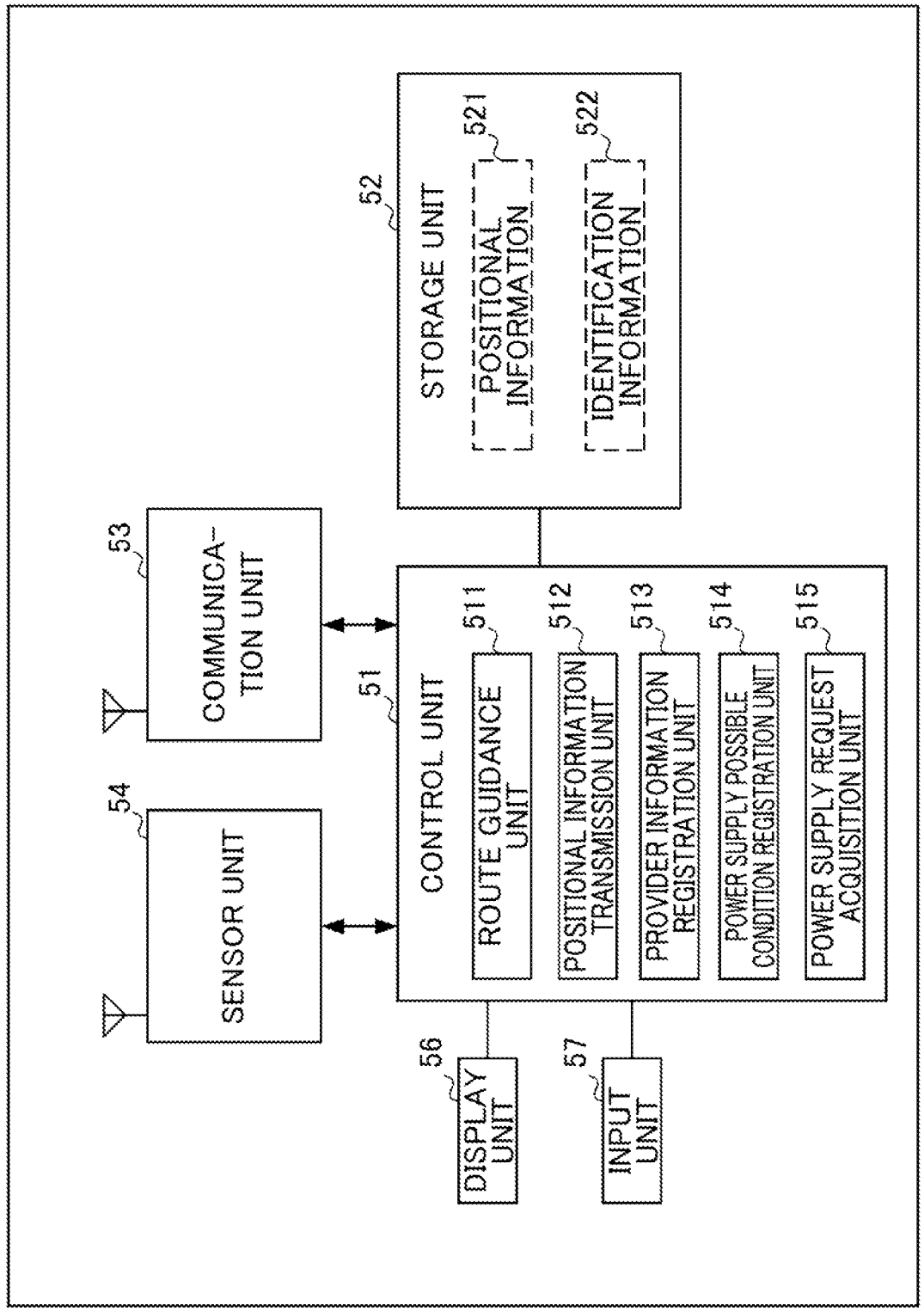
FIG. 6 is a functional block diagram showing a functional configuration of an onboard device according to an exemplary embodiment of the present disclosure.

FIG. 6 shows a functional block diagram showing the functional configuration of the onboard device 50. As shown in FIG. 6, the onboard device 50 includes at least a control unit 51, a storage unit 52, a communication unit 53, a sensor unit 54, a display unit 56, and an input unit 57.

Herein, the control unit 51, the storage unit 52, the communication unit 53, the display unit 56, and the input unit 57 are realized by hardware equivalent to the functional blocks of the same name included in the server 10 described above; however, their functions and uses are different from those of the server 10 described above. Therefore, redundant descriptions of the hardware will be partially omitted, and the explanations of different functions and uses will be described below.

The control unit 51 includes an arithmetic processing device such as a microprocessor, and performs control of each unit constituting the onboard device 50. Details of the control unit 51 will be described later. The storage unit 52 includes semiconductor memory or the like, and stores various programs such as a control program such as firmware and an operating system, a program for performing route guidance processing, a program for transmitting positional information to the server 10, a program for registering information about the provider and the electrical vehicle 60 in the server 10, a program for acquiring information related to a request for power supply from the server 10 and presenting it to the provider, and other information such as map information. In the drawings, the positional information 521 and the identification information 522, which are information particularly related to the transmission processing of the positional information, are illustrated as information stored in the storage unit 52.

The positional information 521 is the positional information of the onboard device 50 which is positioned by the sensor unit 54 to be described later (i.e., the positional information of the electric vehicle 60). The positional information 521 includes not only the information indicating the measured position, but also the time (date and time information) at which the positioning was performed.

In addition, the identification information 522 is information for identifying the onboard device 50. As the identification information 522, for example, a production serial number or the like uniquely assigned to the onboard device 50 can be used. Furthermore, in order to connect the communication unit 53 to a communication network (not shown) which is a network such as a cellular telephone network, the telephone number assigned to the SIM (Subscriber Identity Module) inserted into the communication unit 53 can be used as the identification information 522. In addition, a VIN (vehicle identification number) or a number plate number uniquely assigned to the electric vehicle 60 can be used as the identification information 522.

The information stored in the storage unit 52 may be stored in advance in the storage unit 52, or may be appropriately downloaded as necessary from a server device (not shown) connected to a communication network (not shown). Furthermore, the information may be appropriately modified in accordance with the input of the provider or the like.

The communication unit 53 includes a DSP (Digital Signal Processor) and the like, and realizes radio communication with the servers 10 and the like via a communication network (not shown) in accordance with, for example, standards such as LTE (Long Term Evolution) and 4G, 5G, or a standard such as Wi-Fi (registered trademark).

The sensor unit 54, for example, includes a GPS (Global Positioning System) sensor, a gyro sensor, or an acceleration sensor. The sensor unit 54 includes a function of detecting the positional information, receives the GPS satellite signal by the GPS sensor, and positions the positional information of the onboard device 50 (latitude and longitude). The positioning by the sensor unit 54 is performed at predetermined time intervals, for example, at 3 second intervals. The measured positional information is stored in the storage unit 52 as the positional information 521.

In addition, it is possible for the sensor unit 54 to further increase the positioning accuracy of the positional information of the onboard device 50 based on the angular velocity measured by the gyro sensor, and the acceleration measured by the acceleration sensor.

Furthermore, when the GPS communication becomes difficult or impossible, it is also possible for the sensor unit 54 to use AGPS (Assisted Global Positioning System) communication, and calculate the positional information of the onboard device 50 by the base station information acquired from the communication unit 53.

The display unit 56 includes a display device such as a liquid crystal display or an organic electroluminescent panel. The display unit 56 displays an image in response to an instruction from the control unit 51.

The input unit 57 includes an input device (not shown) such as physical switches such as a ten-key pad and a touch screen provided on the display surface of the display unit 56.

Next, the control unit 51 will be described in detail. The control unit 51 includes, for example, a CPU, RAM, ROM, and a microprocessor having an I/O or the like. The CPU executes each program read from the ROM or the storage unit 52, and at the time of the execution of the program, reads the information from, for example, the RAM, ROM, and the storage unit 52, writes the information to the RAM and the storage unit 52, and exchanges signals with the communication unit 53, the sensor unit 54, the display unit 56, and the input unit 57. In this manner, the processing in the present exemplary embodiment is realized by the cooperation of the hardware and the software.

As shown in FIG. 6, the control unit 51 includes a route guidance unit 511, a positional information transmission unit 512, a provider information registration unit 513, a power supply possible condition registration unit 514, and a power supply request acquisition unit 515.

The route guidance unit 511 performs route guidance processing to a destination such as a facility inputted or selected by a provider.

The route guidance processing to the destination is equivalent to the route guidance processing in a general car navigation system. That is, the route guidance unit 511 generates a map to the destination based on the map information (not shown) stored in the storage unit 52, superimposes the current position of the onboard device 50 positioned by the sensor unit 54 on the map, the position of the destination, and the route information to the destination, and displays the superimposed map on the display unit 56, such that the route guidance can be performed. In this case, a voice for route guidance may be outputted from a speaker (not shown). In addition, information on the congestion state of the road, information on the weather, and the like may be acquired by communication by the communication unit 53, and the acquired information may be used for route guidance processing.

It should be noted that the route guidance processing to the destination is well known to those skilled in the art, and a detailed description thereof will be omitted. Furthermore, since map information for performing route guidance processing is also well known to those skilled in the art, detailed description and illustration thereof are omitted.

The positional information transmission unit 512 transmits the positional information 521 and the identification information 522 stored in the storage unit 52 to the server 10 by wireless communication using the communication unit 53.

For example, when the onboard device 50 is a navigation device, the transmission of the positional information 521 and identification information 522 to the server 10 by the positional information transmission unit 512 performed periodically from when the power switch of the electric vehicle 60 is turned on by the provider riding in the electric vehicle 60, and the onboard device 50 is automatically started, until when the power switch of the electric vehicle 60 is turned off. For example, every time the sensor unit 54 performs positioning at a predetermined time interval (e.g., 3 second intervals), the transmission is performed in real time. Furthermore, instead of transmitting the information to the server 10 in real time, a plurality of pieces of the positional information 521 and the identification information 522, which are updated at intervals of three seconds for three minutes, for example, may be collectively transmitted at a time. That is, so-called burst transmission may be performed.

As described above, in order to provide the external power supply system 1 with the electric vehicle 60 of the provider, the provider information registration unit 513 receives information on the provider (e.g., name, address, mail address, etc.) and information on the electric vehicle 60 (e.g., vehicle type, number plate number, vehicle ID of VIN (vehicle identification number), etc.) in advance based on the input operation by the provider via the input unit 57, and registers the information on the server 10 via the communication unit 53.

The power supply possible condition registration unit 514 acquires information such as the power supply available area of the electric vehicle 60 (current location), the SOC of the electric vehicle 60, and the chargeable time slot based on the input operation by the provider via the input unit 57. The power supply possible condition registration unit 514 transmits a power supply possible condition signal including the acquired information to the server 10 via the communication unit 53, and registers the power supply possible condition signal to the server 10.

In the present exemplary embodiment, the power supply possible condition registration unit 514 includes the SOC of the electric vehicle 60 in the power supply possible condition signal; however, the present invention is not limited thereto. The power supply possible condition registration unit 514 may register in the server 10 a power supply possible condition signal including a power supply available area (current location) of the electric vehicle 60 other than the SOC of the electric vehicle 60, a chargeable time slot, or the like. When receiving the power supply request notification from the server 10, the power supply possible condition registration unit 514 may register the SOC of the electric vehicle 60 in the server 10 at the time of transmission of the consignment signal.

The power supply request acquisition unit 515 acquires the power supply request notification through the communication unit 53. The power supply request acquisition unit 515 may acquire the power supply request notification notified from the server 10 by using a publicly known function such as, for example, electronic mail based on the PUSH method or SNS. Then, the power supply request acquisition unit 515 acquires the position (address) of the power supply target included in the power supply request notification, the required electric energy, the power supply start time, and the charging infrastructure information (position (address), route, round-trip period of time). It should be noted that the power supply request acquisition unit 515 may display the acquired power supply request notification on the display unit 56, and may acquire the consignment (Reply) from the provider via the input unit 57 and transmit the consignment signals to the server 10 via the communication unit 53 when the consignment (Reply) is accepted.

<Electric Vehicle 60>

The electric vehicles 60a and 60b as power supply sources, may be each an electric vehicle that includes a power feed port 65 and, for example, a power storage device (not shown), and is capable of traveling using only the power stored in the power storage device. It should be noted that the electric vehicles 60a and 60b may be a hybrid vehicle capable of traveling using both the power stored in the power storage device (not shown) and the output of the engine (not shown), or may be an electric fuel cell vehicle capable of traveling with electric power generated by a chemical reaction between hydrogen and oxygen in a fuel cell (not shown).

Furthermore, the power storage device (not shown) may be a rechargeable DC power source which stores electric power for generating a driving force of the electric vehicle 60, and is a secondary battery such as a lithium-ion battery and a nickel metal hydride battery. The rated output voltage of the power storage device is, for example, about 200 V. It should be noted that the power storage device may be a capacitor having a large capacity.

The power feed port 65 is connectable to a connection port included in the external power feeder 20, and is capable of supplying power of a power storage device (not shown) of the electric vehicle 60 to the external power feeder 20.

Operation of the Present Exemplary Embodiment

Next, the operation of the present exemplary embodiment will be described with reference to the flowcharts of FIGS. 7 and 8. Herein, FIG. 7 is a flowchart showing an operation of confirming the power supply state of the electric vehicle 60a that is supplying power. Furthermore, FIG. 8 is a flowchart showing the operation at the time of vehicle switching.

First, the operation of confirming the power supply state of the electric vehicle 60a that supplies power by the external power feeder 20 will be described with reference to FIG. 7.

In Step S11, the power supply state acquisition unit 220 acquires the distance from the input device (not shown) of the external power feeder 20 or the user terminal 40 to the charging infrastructure.

In Step S12, the power supply state acquisition unit 220 calculates the remaining battery amount necessary for the electric vehicle 60a to move to the charging infrastructure as a predetermined amount (threshold value) based on the distance to the charging infrastructure acquired in Step S11.

In Step S13, the power supply state acquisition unit 220 calculates the SOC (battery remaining amount) of the power storage device (not shown) of the electric vehicle 60a currently being fed as the power supply state, based on the values of the voltage and the current in the power storage device (not shown) of the electric vehicle 60a connected to the connection port 21.

In Step S14, the power supply state acquisition unit 220 determines whether or not the SOC (battery remaining amount) calculated in Step S13 is equal to or less than the threshold value calculated in Step S12. When the SOC (remaining battery capacity) is equal to or less than the threshold value (Yes in Step S14), the processing advances to Step S15. On the other hand, when the SOC (power remaining amount) exceeds the threshold value (No in Step S14), the processing returns to Step S13.

In Step S15, the power supply state acquisition unit 220 executes the vehicle switching processing that switches from the electric vehicle 60a that is currently supplying power, to the electric vehicle 60b. It should be noted that the detailed flow of the vehicle switching processing will be described later.

Next, the operation of switching from the electric vehicle 60a that is currently supplying power to the electric vehicle 60b by the external power feeder 20 will be described with reference to FIG. 8.

In Step S21, the connection state acquisition unit 210 acquires the connection state with the electric vehicles 60 at each of the connection ports 21, and confirms that the electric vehicle 60b is connected based on the acquired connection state.

In Step S22, the converter 23 adjusts the output of the DC power from the electric vehicle 60a and the output of the DC power from the electric vehicle 60b to a voltage of a predetermined value set in advance based on the control instruction of the control unit 200 so as to match to become equal.

In Step S23, the power supply state acquisition unit 220 turns on (connects) the contactor 25 of the electric vehicle 60b.

In Step S24, the power supply state acquisition unit 220 turns off (cuts off) the contactor 25 of the electric vehicle 60a.

In Step S25, the converter 23 shifts directly to the DC/DC circuits 27a and 27b via the contactor 25 without adjusting the voltage from the electric vehicle 60b to a predetermined value.

According to the operation of the present exemplary embodiment as described above, by traveling back and forth as a bucket relay between the charging location and the charging infrastructure of the external power supply to a plurality of electric vehicles in accordance with the distance to the charging infrastructure, it is possible to continuously supply power to the external load even at a location without any electrical facility during disasters, outdoor activities, or other events.

About Hardware and Software

It should be noted that each of the devices included in the abovementioned external power supply system can be realized by hardware, software, or a combination thereof. Herein, the implementation by software means that the computer is implemented by reading and executing programs.

The programs can be stored using various types of non-transitory computer readable media and supplied to a computer. The non-transitory computer-readable media include various types of tangible storage medium. Examples of non-transitory computer-readable media include magnetic recording media (e.g., flexible disks, magnetic tapes, hard disk drives), magnetic-optical recording media (e.g., magnetic optical disks), CD-ROM (Read Only Memory), CD-R, CD-R/W, semiconductor memory (e.g., mask ROM, PROM (Programmable ROM), EPROM (Erasable PROM), flash ROM, RAM (random access memory)). Furthermore, the programs may also be supplied to a computer by various types of transitory computer-readable medium. Examples of transitory computer readable media include electrical signals, optical signals, and electromagnetic waves. The transitory computer readable media may provide the computer with the programs via wired communication paths such as electrical wires and optical fibers, or wireless communication paths.

Modification Example 1

Although the above-described exemplary embodiment is a preferred embodiment of the present disclosure, it is not intended to limit the scope of the present disclosure only to the above-described embodiment, and it is possible to implement the exemplary embodiment in a form in which various modifications are made without departing from the gist of the present disclosure.

For example, the functional configurations of FIGS. 2, 3, 5, and 6 are merely examples, and are not intended to limit the functional configurations of the present exemplary embodiment. That is, it suffices if each device is provided with a function capable of executing a series of processing relating to the function of the present disclosure as a whole, and what functional block is used for realizing this function is not particularly limited to the examples of FIGS. 2, 3, 5, and 6.

For example, when the user of the external power feeder 20 also owns the electric vehicle 60, the user may also be a provider of the electric vehicle 60, so that the user terminal 40 may be provided with the function of the onboard device 50. In so doing, it is possible for the user to use the external power supply system 1 to supply power to the external power feeder 20 from their own electric vehicle 60, and manage the charging timing of the electric vehicle 60.

Furthermore, when the administrator of the server 10 providing the external power supply system 1 owns a plurality of electric vehicles 60, the administrator may become a provider of the electric vehicles 60, and therefore, the server 10 may have the function of the onboard device 50.

In addition, the exemplary embodiment described above may be modified, for example, as modification examples described below. It should be noted that the following modification examples may be further combined.

Modification Example 2

The system configuration in the exemplary embodiment described above is merely an example, and may be changed as appropriate. For example, in the above-described exemplary embodiment, the server 10 is realized by a single server device or the like; however, each function of the server 10 may be distributed to a plurality of server devices as appropriate, and the server 10 may be realized as a distributed processing system. Furthermore, each function of the server 10 may be realized by using a virtual server function or the like on the cloud.

Modification Example 3

The configuration of the onboard device 50 in the above-described exemplary embodiment is merely an example, and may be changed as appropriate. For example, in the above-described exemplary embodiment, a smartphone or the like used by the provider may function as the onboard device 50. In so doing, the server 10 can be easily contacted with the provider and receive consignment signals to the electric vehicle 60.

Modification Example 4

The configuration of the external power feeder 20 in the exemplary embodiment described above is merely an example, and may be changed as appropriate. For example, in the exemplary embodiment described above, the external power feeder 20 may have the function of the user terminal 40. In so doing, the external power feeder 20 can acquire the positional information and the distance or the like of the charging infrastructure from the server 10.

Modification Example 5

The configuration of the electric vehicle 60 in the exemplary embodiment described above is merely an example, and may be changed as appropriate. For example, in the exemplary embodiment described above, the electric vehicle 60 may have a function of unmanned automatic operation. In this case, when the battery remaining amount of the electric vehicle 60 is equal to or less than a threshold value, the external power feeder 20 may automatically switch from the electric vehicle 60 to another electric vehicle 60, and allow the electric vehicle 60 having battery remaining amount of equal to or less than the threshold value to the charging infrastructure by the unmanned automatic operation. By doing so, it is possible for the user to use electricity without stress, without the trouble of switching.

EXPLANATION OF REFERENCE NUMERALS

1 external power supply system
10 server
20 external power feeder
21(1) to 21(*n*) connection port
23 converter
25 contactor
27*a*, 27*b* DC/DC circuit
29*a*, 29*b* inverter 30 external load
40 user terminal
50a, 50b onboard device
60a, 60b vehicle

What is claimed is:

1. An external power feeder connectable to a plurality of power supply source mobile bodies serving as power supply sources, the external power feeder comprising:
a plurality of connection ports which are respectively in connection with the plurality of power supply source mobile bodies;
a connection state acquisition unit that acquires a connection state of each of the plurality of connection ports with the power supply source mobile body;
a power supply state acquisition unit that acquires a power supply state from each of the plurality of power supply source mobile bodies; and
a switching unit that, in a case in which the connection state acquisition unit has detected at least two connections of the power supply source mobile bodies, switches from power supply from one power supply source mobile body that supplies power to power supply from one other power supply source mobile body, among the connected power supply source mobile bodies, based on a power supply state of the one power supply source mobile body acquired by the power supply state acquisition unit,
wherein the connection state acquisition unit acquires a distance from a location of the external power feeder to a charging infrastructure, and calculates a predetermined amount of a power remaining amount required for the power supply source mobile body supplying power to the external power feeder to move to the charging infrastructure, and
the switching unit switches to power supply from the one other power supply source mobile body based on the power supply state of the one power supply source mobile body acquired by the power supply state acquisition unit and the predetermined amount.

2. The external power feeder according to claim 1, further comprising an adjustment unit that adjusts an output from each of the plurality of power supply source mobile bodies to a predetermined value,
wherein the switching unit stops the power supply from the one power supply source mobile body after the power supply from the other power supply source mobile body has started at the predetermined value, during the power supply from the one power supply source mobile body at the predetermined value.

3. The external power feeder according to claim 1, wherein
the power supply state acquisition unit acquires information as to whether each of the plurality of power supply source mobile bodies can supply power or not based on a remaining power amount of each of the plurality of power supply source mobile bodies, and determines that supplying power is not possible when the remaining power amount is equal to or less than a predetermined amount, and
the switching unit switches to power supply from a power supply source mobile body available for charging among the plurality of power supply source mobile bodies.

4. An external power supply system comprising:
the external power feeder according to claim 1;
a terminal device of a user of the external power feeder;
a plurality of power supply source mobile bodies; and
a management device,
wherein at least the terminal device request information requests an arrangement of a power supply source mobile body for the external power feeder to the management device, and
the management device acquires a power supply possible condition signal of the plurality of power supply source mobile bodies, and transmits a power supply request notification of the external power feeder to the plurality of power supply source mobile bodies.

* * * * *